(12) United States Patent
Zhu et al.

(10) Patent No.: US 12,372,636 B2
(45) Date of Patent: Jul. 29, 2025

(54) METHOD AND SYSTEM FOR OBJECT DETECTION

(71) Applicant: Aptiv Technologies AG, Schaffhausen (CH)

(72) Inventors: Weimeng Zhu, Wuppertal (DE); Yu Su, Wuppertal, DE (US); Peet Cremer, Düsseldorf (DE); Ori Maoz, Bergisch Gladbach (DE); Stephanie Lessmann, Erkrath (DE); Igor Kossaczký, Wuppertal (DE); Saeid Khalili Dehkordi, Wuppertal (DE); Sven Labusch, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 285 days.

(21) Appl. No.: 16/911,605

(22) Filed: Jun. 25, 2020

(65) Prior Publication Data

US 2021/0018609 A1    Jan. 21, 2021

(30) Foreign Application Priority Data

Jul. 17, 2019    (EP) ..................... 19186811

(51) Int. Cl.
*G01S 13/48* (2006.01)
*G01S 13/44* (2006.01)
*G01S 13/58* (2006.01)

(52) U.S. Cl.
CPC .......... *G01S 13/48* (2013.01); *G01S 13/4445* (2013.01); *G01S 13/589* (2013.01)

(58) Field of Classification Search
None
See application file for complete search history.

(56) References Cited

U.S. PATENT DOCUMENTS

| | | | |
|---|---|---|---|
| 2017/0067991 A1* | 3/2017 | Liu | G01S 13/87 |
| 2018/0348346 A1 | 12/2018 | Vallespi-Gonzalez et al. | |
| 2019/0146497 A1 | 5/2019 | Urtasun et al. | |
| 2020/0103523 A1* | 4/2020 | Liu | G01S 13/865 |

OTHER PUBLICATIONS

Extended European Search Report for Application No. EP 19 18 6811, dated Jan. 28, 2020.

* cited by examiner

*Primary Examiner* — Whitney Moore
(74) *Attorney, Agent, or Firm* — Harness, Dickey & Pierce, P.L.C.

(57) ABSTRACT

A computer implemented method for detecting objects includes providing signal representation data comprising range information, velocity information and angular information; for each of a plurality of spatial scales, determining respective scaled data for the respective spatial scale based on the signal representation data, to obtain a plurality of scaled data; providing the plurality of scaled data to a plurality of detectors; and each detector carrying out object detection based on at least one of the plurality of scaled data.

14 Claims, 4 Drawing Sheets

METHOD AND SYSTEM FOR OBJECT DETECTION

CROSS REFERENCE TO RELATED APPLICATION

This application claims priority to European Patent Application No. EP 19186811.6, filed on Jul. 17, 2019.

FIELD

The present disclosure relates to methods for object detection, for example using radar data.

BACKGROUND

In conventional signal processing for chirp sequence radars, the aim is to create detection points by estimating a range, radial speed and angle for physical points spread out in the measurement environment that reflect the transmitted energy from the radar transmitter back towards a receiver. The amount of reflected energy is highly dependent on the objects material, orientation, geometrical shape and size. In this context, usually Fourier transforms are used to convert the time/spatial domain data into frequency responses that can be interpretable for humans. A common method is to create range-Doppler maps that indicate the radial distance and speed of objects in the scene, respectively. These responses are then thresholded to filter out any responses that are likely to be noise or interferences and are therefore not of interest. As a further step, the remaining detections are processed onwards to extract an angle in the spatial domain (utilizing receiver arrays) which will then be used along with the range information of the reflective point to pinpoint it exactly in the scene.

The problem with this technique is that for every range-Doppler cell the spatial information covers a rather large field of view (e.g. −75 to +75 degrees) which may contain many scatterers. This is especially true if the scene under measurement contains many stationary objects. If the ego vehicle (in other words: the vehicle on which the radar sensor is provided) stands still, stationary objects would lead to many points in the zero-th Doppler bin corresponding to non-moving objects. In such cases, distinguishing between multiple reflectors becomes very difficult, and often computationally expensive high-resolution techniques are deployed to resolve multiple reflection points.

Accordingly, there is a need to provide systems and methods for efficient objection detection.

SUMMARY

In one aspect, the present disclosure includes a computer implemented method for object detection. The method includes the following steps carried out by computer hardware components: providing signal representation data comprising range information, velocity information and angular information; for each of a plurality of spatial scales, determining respective scaled data for the respective spatial scale based on the signal representation data, to obtain a plurality of scaled data; providing the plurality of scaled data to a plurality of detectors; and each detector carrying out object detection based on at least one of the plurality of scaled data.

In other words, a plurality of scaled versions of input signal data is provided to a plurality of detectors, and each detector uses at least one of the scaled versions for object detection.

Providing scaled data of various scales to a plurality of detectors may enhance detection efficiency and detection accuracy, in particular when dealing with different sizes of objects in the area of interest. The scaled data may also be referred to as a pyramid of spatial scales. For example, deep pyramid levels may include information that is more suitable for detecting large objects, whilst shallow pyramid levels contain information that is more suitable for detecting small objects.

According to another aspect, the signal representation data is based on at least one of radar signals or ultrasonic signals. For example, the signal representation data may be based on information (for example energy or frequency) of a received reflection of a transmitted signal. Based on the energy of the received reflection, and based on the temporal distribution of the energy of the received reflection (in other words: of the received reflected signal), a distance of an object that reflects the transmitted signal may be determined (for example by determining the time between transmission of the signal and reception of the reflected signal). According to another aspect, the signal representation data comprises frequency-domain radar data. Based on a phase shift that is derivable from the received signal and its frequency, a velocity of the object may be determined (for example based on a Doppler shift in the frequency of the reflected signal).

According to another aspect, the signal representation data is based on signals received by an array of antennas. By determining a difference in time of arrival between a reflected signal received at various antennas, the direction of arrival (in other words: angle) may be determined.

It will be understood that while the signal representation data comprises range information, velocity information and angular information, these information (range information, velocity information and angular information) is not necessarily present explicitly (in other words: determined or decoded) in the signal representation data, but rather these information may be derivable from the signal representation data.

According to another aspect, the signal representation data is determined as dense data based on sparse input data, preferably based on a transformation preserving a spatial order of the sparse input data. It has been found that processing based on sparse data may hinder machine learning applications, because it may considerably increase the amount of training data needed to effectively train a machine-learning model. Converting the sparse data into dense data may thus enhance processing.

According to another aspect, the plurality of spatial scales are provided in a hierarchy from fine spatial resolution to coarse spatial resolution. According to various embodiments, the data on the various spatial scales (in other words: the data with the various spatial resolutions) is determined based on sharing information both horizontally (i.e. within one level of the pyramid; in other words: among data of same spatial resolution) and vertically (i.e. from one level of the pyramid to another level of the pyramid; in other words: among data of different spatial resolution). Each level in the feature pyramid according to various embodiments may include multiple feature vectors, each describing the radar response from a different range. When determining data for a coarse pyramid level feature, features from several fine ranges may be combined into a single coarse range. Features from different ranges may be combined, i.e. data is combined in one dimension (1D). It will be understood that various methods may be used for determining data of the different pyramid levels, for example averaging, max pooling, neural networks, or any other method that is suitable for scaling data into a coarser scale or a finer scale. The features in each level may be determined based on features in other levels and based on the received radar data (for example a pattern of energy of received (for example reflected) radar signals).

According to another aspect, the plurality of spatial scales are related to the range information of the signal representation data. In other words: the signal representation data is scaled in relation to range information. It has been found that this may enhance object detection of objects of varying size (for example when objects of small size and objects of a size that is much bigger than the small size are to be detected).

According to another aspect, each detector carries out the object detection in a respective pre-determined spatial region. According to another aspect, the respective pre-determined spatial regions of the plurality of detectors are provided across a pre-determined range in polar angle coordinates.

The respective pre-determined region for each detector may vary in size. For example, there may be small pre-determined regions and large pre-determined regions. There may be regions of a plurality of different sizes.

According to another aspect, each of the detectors provides a respective confidence of the object detection carried out. This may enhance further processing of the detection results, since detection results that have a high confidence may be treated differently from detection results with low confidence.

According to another aspect, each detector, upon detecting an object, predicts a property of the detected object. The property of the detected object comprises at least one of a location of the detected object, a size of the detected object, an orientation of the detected object, a velocity of the detected object, a shape of the detected object, or a class of the detected object. Detecting the class may classify the detected object into one of a plurality of classes. For example, it may be detected whether the detected object is a truck, a car, a bicycle, or a pedestrian. These properties may then be used for further processing, for example in controlling an autonomous car.

According to another aspect, at least one of the steps is carried out by a neural network. The neural network may be trained based on labeled data, the labeled data comprising reference object information and data based on which reference signal representation data is obtainable. This may allow automatically learning a complete object detection model without requiring manual design of features, modules or encodings. The neural network may, for example, be a convolutional neural network (CNN), for example a deep convolutional neural network (deep CNN).

In another aspect, the present disclosure is directed at a computer system, said computer system being configured to carry out several or all steps of the computer implemented method described herein.

The computer system may comprise a plurality of computer hardware components (for example a processing unit (in other words: processor), at least one memory unit (which may also be referred to as memory) and at least one non-transitory data storage, for example hard disk drive or solid-state drive). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Exemplary embodiments and functions of the present disclosure are described herein in conjunction with the following drawings, showing schematically:

DETAILED DESCRIPTION

Figure 1:
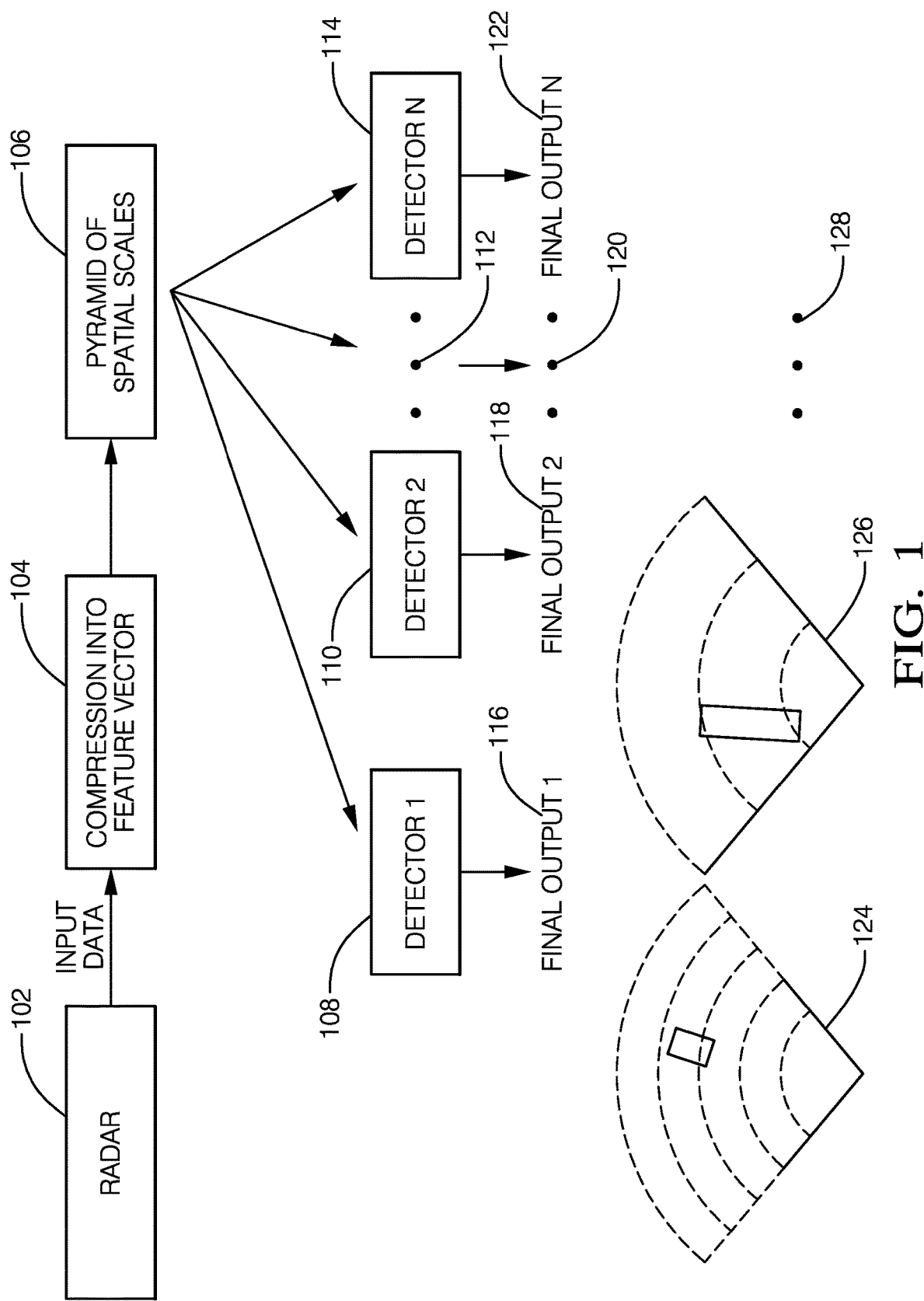
FIG. 1 is a diagram illustrating an overview of data flow from a radar, through a neural-network structure, to a final output of object detections according to various embodiments.

FIG. 1 depicts a diagram 100 illustrating an overview of data flow from a radar, through a neural-network structure, to a final output of object detections according to various embodiments.

According to various embodiments, detection and classification of multiple objects may be performed directly from frequency-domain radar sensor data, for example using machine learning methods. A plurality of object detectors (for example N object detectors, for example a first object detector 108, a second object detector 110, further object detectors 112 like indicated by dots, and an N-th object detector 114) may be provided. Multiple object detectors 108, 110, 112, 114 may each be tuned to a respective particular region of space, whereupon all of these detectors 108, 110, 112, 114 share a common input (for example a feature vector, for example including a pyramid of special scales 106) and preprocessing chain.

Each of these detectors 108, 110, 112, 114 may determine an output (for example, the first detector 108 may determine a first output 116, the second detector 110 may determine a second output 118, the further detectors 112 may determine further outputs 120 indicated by dots, and the N-th detector 114 may determine an N-th output 122). In more detail, each of the detectors 108, 110, 112, 114 may localize an object within its associated region, and may classify the object into one of multiple classes. Each of these detectors 108, 110, 112, 114 may furthermore predict various properties of the detected object, such as for example dimensions, orientations, or velocity. Illustrations 124 and 126 show an area of interest with detection results of the detectors 108 and 118, respectively, and will be described in more detail with reference to FIG. 2A and FIG. 2B below. Further detectors 112 and the N-th detector may provide further detection results in the area of interest, like illustrated by dots 128.

Radar 102 (for example a chirp sequence radar) may provide radar data as input data for generation of a feature vector (in other words: for compression into a feature vector) 104.

Various embodiments may include a radar which includes an array of antennas. Such a radar may provide, for each antenna, a signal corresponding to each possible combination of range and relative velocity. All these signals from the different antennas may be combined for further processing, for example further processing by a neural network.

Signals received in different antennas in the radar's array are slightly shifted in time and phase. According to various embodiments, this information may be used to extract the direction of arrival of the signals reflected by objects in the scene in order to infer their relative position. Furthermore, the pattern of reflections may be used in order to predict the object's class (in other words: identity; for example indicating whether the object is a truck, a car, a bicycle, or a pedestrian) and its further properties such as size and orientation.

According to various embodiments, a neural network approach is provided which involves combining the range information, velocity information and angular information (for example based on the phase-shift of the signals received by the multiple antennas) into a single mixed representation (which may be referred to as compressed data cube). An anchor-based neural network for object detection on radar compressed data cube is provided.

In various available radar implementations, data is transmitted in a compressed and/or sparse format in order to overcome the limited bandwidth between the radar sensor and the central processing unit. However, processing based on sparse data may hinder machine learning applications, because it may considerably increase the amount of training data needed to effectively train a machine-learning model. According to various embodiments, if a radar implementation with compressed and/or sparse data is used, a compression step may be applied as part of a neural network, which may transform the sparse signal into a dense one while preserving its spatial ordering. For example, a convolution calculation may preserve the spatial order by applying a sliding window on a spatial dimension. The general order of that spatial dimension may stay unchanged. For example, a [1 1] kernel on [1 0 0 0 1 1] data by step size (stride) of 2 may output [1 0 2] which may still preserve the data's spatial arrangement.

The mixed dense representation of the radar signal may be stored as a feature vector (104). A neural network may be used to increasingly compress the feature vector into smaller and smaller spatial resolutions, resulting in a feature pyramid 106, wherein the compression is applied only along the range dimension of the radar data. This pyramid of spatial scales 106 (in other words: feature pyramid) may then be subsequently expanded back again to increasingly large resolutions. The pyramid of spatial scales may keep different resolutions of information inside each pyramid level. Such resolutions can improve the object detector performance for dealing with different size of objects in image. For example, a deep pyramid level may include information for large objects whilst a shallow pyramid level may include information for small objects.

The compressed features in increasing spatial scales (in other words: the feature pyramid 106) may then be fed into the multiple detectors 108, 110, 112, 114, each of which may be capable of detecting an object within a specified region of space and determining various properties of the detected object.

The specified region may be different for the different detectors 108, 110, 112, 114; in other words: each of the detectors 108, 110, 112, 114 may have its own specified region, which may be different from the specified regions of all other detectors. While being pairwise different, the respective specified regions of the different detectors 108, 110, 112, 114 may overlap. The respective specified regions may have different size, but there may be more than one specified region for each size (but with different location). The respective specified regions may also be referred to as anchors.

Each detector 108, 110, 112, 114 is provided data from multiple spatial scales (in the compressed pyramid, in other words: pyramid of spatial scales 106) and may attempt to detect objects within all scales. According to various embodiments, the detectors 108, 110, 112, 114 may be distributed across the polar angle coordinates of the scene, and the same set of detectors 108, 110, 112, 114 may be shared among multiple spatial ranges (in other words: the same set of detectors may be applied to the data in multiple scales in the pyramid of spatial scales 106). Although each detector 108, 110, 112, 114 may be optimized for objects of a particular scale, each detector 108, 110, 112, 114 may detect objects of any scale in the pyramid of spatial scales 106.

According to various embodiments, a pre-determined number of detectors 108, 110, 112, 114 may be provided, and these detectors 108, 110, 112, 114 may be assigned to angular ranges of the spatial domain in which objects are to be determined.

When provided with an input radar signal (in the form of the pyramid of spatial scales 106), each detector 108, 110, 112, 114 outputs its confidence to whether there is an object within its assigned spatial region. Furthermore, each detector 108, 110, 112, 114 predicts the exact location of the object within that region as well as various properties of the object. The confidences of the detectors 108, 110, 112, 114 can be used to feed further processing such as removal of duplicate detections or object tracking.

A neural network carrying out the processing according to various embodiments, including the initial compression 104, determining data on the multiple spatial scales (in other words: determining the pyramid of spatial scales 106), and the object detectors 108, 110, 112, 114 may be trained end-to-end from labeled radar data. This end-to-end training may allow automatic learning of a complete object detection model without requiring manual design of features, modules or encodings.

While a conventional assumption is to estimate only single point scatterers, the method according to various embodiments uses a whole energy spectrum from the antenna measurements without directly extracting any angular information with the insight that the energy focused around spectrum peaks contains useful information and can be a learnable feature for a neural network. In other words: according to various embodiments, the direction of arrival (DOA) is not limited to a single scattering point only, but rather the spread of the reflected energy from the object of interest is considered which removes the necessity to associate single points (range, angle) to objects. Each object or a part thereof "seen" by the radar may be a complex pattern of radar energies, which may be a result of the object's shape and properties. Thus, the object's properties may be reconstructed (or approximated) from the pattern of energy received by the radar. Conventional radar processing systems extract the object location from the pattern in their preprocessing steps, discarding the pattern itself, and can detect only the object's position. According to various embodiments, the pattern (or a derived form generated during the compression and pyramid phases) may be passed all the way to the anchor-based detectors, allowing these detectors to reconstruct properties of the object.

Figure 2A:
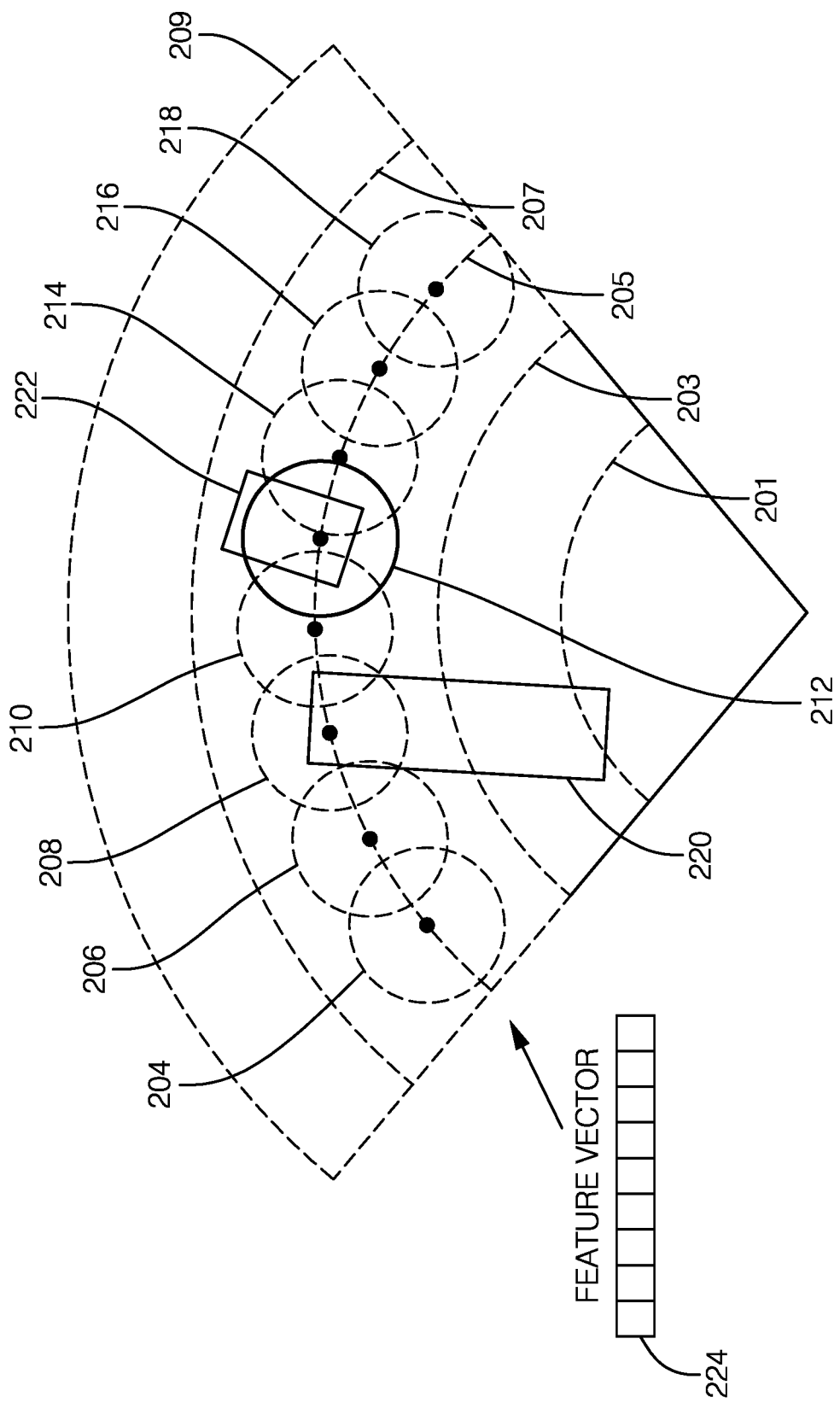
FIG. 2A is an illustration of various detectors with various respective small regions in which the detectors carry out the object detection according to various embodiments.
Figure 2B:
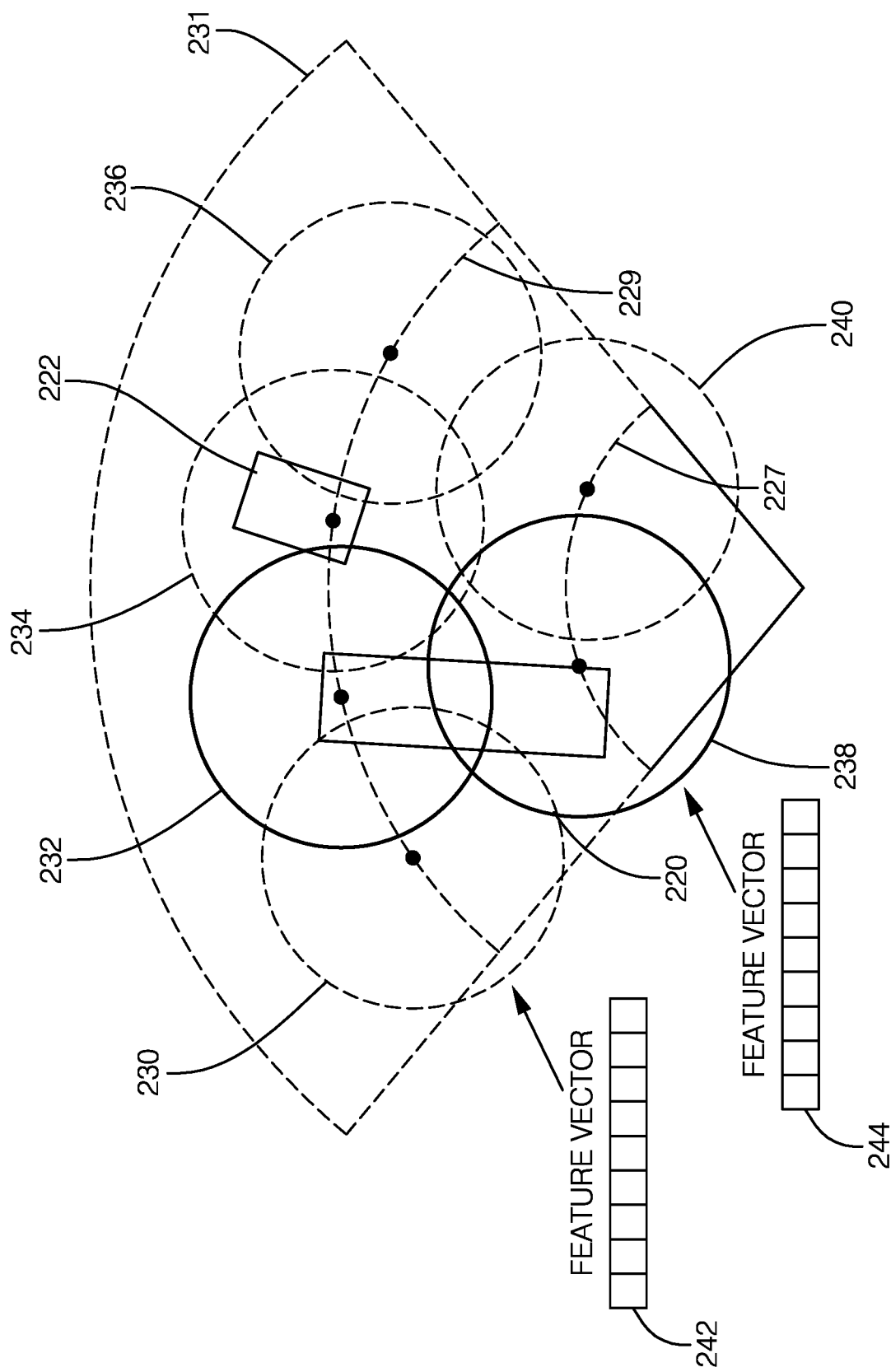
FIG. 2B is an illustration of various detectors with various respective large regions in which the detectors carry out the object detection according to various embodiments.

FIG. 2A and FIG. 2B show illustrations 200 and 226 of various detectors with various respective regions in which the detectors carry out the object detection on different levels of range of the pyramid of scales according to various embodiments. It will be understood that each of FIG. 2A and FIG. 2B each only shows one level of range-pyramid, illustrating how different pyramid-levels cover multiple sizes of objects.

Illustration 200 of FIG. 2A shows an illustration of detectors on a fine scale. For example, the total area of interest for object detection is separated by several circular segments (in other words: arcs) 201, 203, 205, 207, 209 and detectors are provided along the circular segments 201, 203, 205, 207, 209. In each range (for example along each of the lines of the circular segments 201, 203, 205, 207, 209, multiple object detectors are trained to detect objects within their vicinity. Each of the arcs 201, 203, 205, 207, 209 refers to a different range in a single (in other words: in the same) pyramid level.

For sake of illustration, detectors are illustrated along the line of one of the circular segments 201, 203, 205, 207, 209 in FIG. 2A only (along circular segment 205). Each of the plurality of detectors may carry out detection in a respective region (for example regions 204, 206, 208, 210, 212, 214, 216, and 218). It will be understood that while the regions are illustrated by circles in FIG. 2A, the shape of the regions (in other words: anchors) is not limited to a circular shape, but the regions may have any shape other than circles, for example ovals, rectangles, squares or general polygons.

A plurality of objects (for example a large object 220 and a small object 222) to be detected may be present in the area of interest. It will be understood that while the objects 220, 222 are illustrated by rectangular boxes in FIG. 2A, the shape of the objects is not limited to a rectangular shape, but the objects may have any shape other than rectangles. The shape of the objects 220, 222 may be unknown, and may be one of the properties of the objects that the detectors shall detect.

A feature vector 224, which may include the data of the pyramid of spatial scales 106 may be provided to each of the detectors that operate on a range corresponding to arc 205. Detectors that operate on the range corresponding to arc 205 may receive the feature vector 224 as input, which may include data for one scale in the pyramid of scales (the scale corresponding to the coarseness of arcs 201, 203, 205, 207, 209 illustrated in FIG. 2A) and one range (the range corresponding to arc 205). Each of the detectors may carry out object detection based on the feature vector 224 (in other words: based on at least one of the scaled data in the pyramid of spatial scales 106).

Like illustrated by a bold solid circle in FIG. 2A, the small object 222 may be detected by the detector that carries out object detection in region 212. The large object 220 may not be detected by any of the detectors that carry out detection in the small regions 204, 206, 208, 210, 212, 214, 216, and 218.

Illustration 226 of FIG. 2B shows an illustration of detectors on a scale that is coarser than the fine scale illustrated in FIG. 2A. The total area of interest for object detection is separated by several circular segments (in other words: arcs) 227, 229, 231, and detectors are provided along the circular segments 227, 229, 231, wherein the distance between the circular segments 227, 229, 231 for the coarser scale is larger than the distance of the circular segments 201, 203, 205, 207, 209 for the finer scale illustrated in FIG. 2A. Each of the arcs 227, 229, 231 refers to a different range in a single (in other words: in the same) pyramid level. It will be understood that the arcs 201, 203, 205, 207, 209 of FIG. 2A are related to a finer scale in the pyramid of scales than the arcs 227, 229, 231 of FIG. 2B; in other words, the pyramid level illustrated in FIG. 2A is finer than the pyramid level illustrated in FIG. 2B; in other words, the pyramid level illustrated in FIG. 2B is coarser than the pyramid level illustrated in FIG. 2A. In each range (for example along each of the lines of the circular segments 227, 229, 231), multiple object detectors are trained to detect objects within their vicinity.

For sake of illustration, detectors are illustrated along the circular segments 227 and 229 in FIG. 2B only. Detectors that operate on the range corresponding to arc 229 may receive a feature vector 242 as input, which may include data for one scale in the pyramid of scales (the scale corresponding to the coarseness of arcs 227, 229, 231 illustrated in FIG. 2B) and one range (the range corresponding to arc 229). Detectors that operate on the range corresponding to arc 227 may receive a feature vector 244 as input, which may include data for one scale in the pyramid of scales (the scale corresponding to the coarseness of arcs 227, 229, 231 illustrated in FIG. 2B) and one range (the range corresponding to arc 227). Each of the plurality of detectors may carry out detection in a respective region (for example regions 230, 232, 234, 236, 238, and 240). It will be understood that while the regions are illustrated by circles in FIG. 2B, the shape of the regions (in other words: anchors) is not limited to a circular shape, but the regions may have any shape other than circles, for example ovals, rectangles, squares or general polygons.

Like illustrated by bold solid circles in FIG. 2B, the large object 220 may be detected by the detector that carries out object detection in region 232, and the large object 220 may also be detected by the detector that carries out object detection in region 238. The small object 222 may not be detected by any of the detectors that carry out detection in the large regions 230, 232, 234, 236, 238, and 240.

Like illustrated by FIG. 2A and FIG. 2B, according to various embodiments, the sensor data is processed in multiple scales and with detectors with regions of different size, so that larger objects are detected in the more coarse-grained scales. For example, FIG. 2A illustrates a level corresponding to a finer scale of the pyramid of scales than the scale of the level that is illustrated in FIG. 2B. For example, FIG. 2A illustrates a level of the pyramid of scales that corresponds to a coarseness (in other words: fineness) of arcs 201, 203, 205, 207, 209. FIG. 2B illustrates a level of the pyramid of scales that corresponds to a coarseness (in other words: fineness) of arcs 227, 229, 231.

As described above, the feature pyramid (in other words: a respective plurality of data for a plurality of spatial scales) according to various embodiments may include distinct features for each range in each pyramid level. For example, each of the three illustrated feature vectors 224, 242, 244 may be distinct. For each pyramid level, all the detectors (which may be referred to as anchors) in the same range may receive the same feature vector describing that range in that pyramid level. Detectors in the same pyramid level but in different ranges may receive different feature vectors. Detectors in different pyramid levels may receive different feature vectors.

Figure 3:
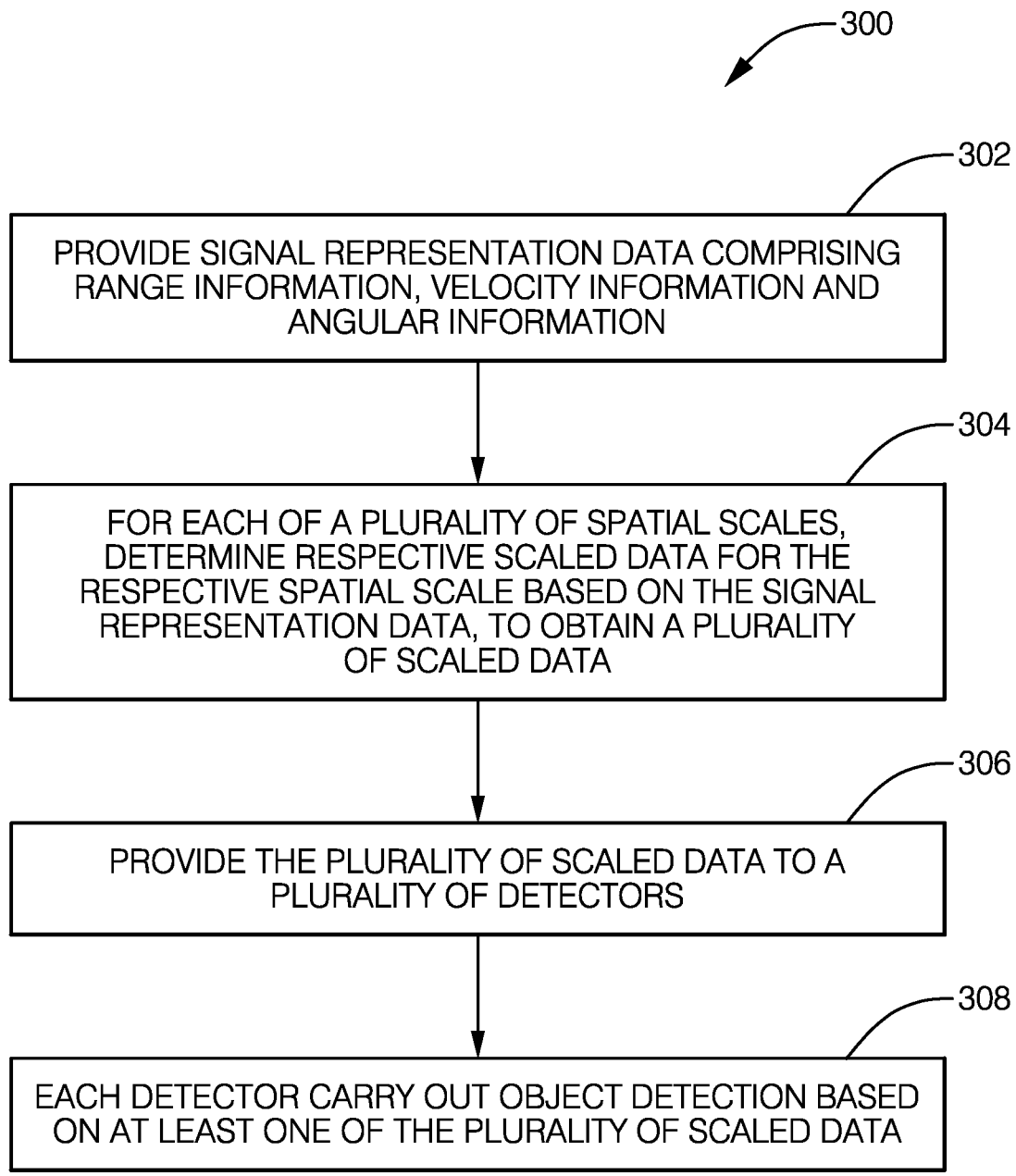
FIG. 3 is a flow diagram illustrating a computer implemented method for object detection according to various embodiments.

FIG. 3 shows a flow diagram 300 illustrating a computer implemented method for object detection according to various embodiments. At 302, signal representation data may be provided. The signal representation data may include range information, velocity information and angular information. At 304, respective scaled data for each of a plurality of spatial scales may be determined for the respective spatial scale based on the signal representation data, to obtain a plurality of scaled data. At 306, the plurality of scaled data may be provided to a plurality of detectors. At 308, each detector may carry out object detection based on at least one of the plurality of scaled data.

According to various embodiments, the signal representation data may be or may be based on at least one of radar signals or ultrasonic signals. According to various embodiments, the signal representation data may include or may be frequency-domain radar data. According to various embodiments, the signal representation data may be or may be based on signals received by an array of antennas.

According to various embodiments, the signal representation data may be determined as dense data based on sparse input data.

According to various embodiments, the plurality of spatial scales may be provided in a hierarchy from fine spatial resolution to coarse spatial resolution.

According to various embodiments, the plurality of spatial scales may be related to the range information of the signal representation data.

According to various embodiments, each detector may carry out the object detection in a respective pre-determined spatial region. According to various embodiments, the respective pre-determined spatial regions of the plurality of detectors may be provided across a pre-determined range in polar angle coordinates.

According to various embodiments, each of the detectors may provide a respective confidence of the object detection carried out.

According to various embodiments, each detector, upon detecting an object, may predict a property of the detected object. According to various embodiments, the property of the detected object may include or may be a location of the detected object, and/or a size of the detected object, and/or an orientation of the detected object, and/or a velocity of the detected object, and/or a shape of the detected object, and/or a class of the detected object.

According to various embodiments, at least one of the steps 302, 304, 306, 308 or any further step carried out by the method according to various embodiments may be trained based on labeled data. The labeled data may include reference object information and data based on which reference signal representation data is obtainable.

Each of the steps 302, 304, 306, 308 and the further steps described above may be performed by computer hardware components.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A computer implemented method for object detection, the method comprising:
receiving signal representation data comprising range information, velocity information, and angular information;
for each of a plurality of spatial scales, determining respective scaled data for the respective spatial scale, based on the signal representation data, to obtain a plurality of scaled data;
providing the plurality of scaled data to a plurality of detectors; and
carrying out, with each detector of the plurality of detectors, object detection based on at least one of the plurality of scaled data in a respective predetermined spatial region assigned to the respective detector;
wherein the respective predetermined spatial regions of the plurality of detectors overlap and have different sizes;
wherein each detector of the plurality of detectors is tuned to a respective particular region of space; and
wherein all of the detectors of the plurality of detectors share a common input and preprocessing chain.

2. The computer implemented method of claim 1, wherein the signal representation data is based on at least one of radar signals or ultrasonic signals.

3. The computer implemented method of claim 1, wherein the signal representation data comprises frequency-domain radar data.

4. The computer implemented method of claim 1, wherein the signal representation data is based on signals received by an array of antennas.

5. The computer implemented method of claim 1, wherein the signal representation data is determined as dense data based on sparse input data based on a transformation preserving a spatial order of the sparse input data.

6. The computer implemented method of claim 1, wherein the plurality of spatial scales are provided in a hierarchy from fine spatial resolution to coarse spatial resolution.

7. The computer implemented method of claim 1, wherein the plurality of spatial scales are related to the range information of the signal representation data.

8. The computer implemented method of claim 1, wherein the respective pre-determined spatial regions of the plurality of detectors are provided across a predetermined range in polar angle coordinates.

9. The computer implemented method of claim 1, wherein each detector of the plurality of detectors provides a respective confidence of the object detection.

10. The computer implemented method of claim 1, wherein each detector of the plurality of detectors, upon detecting an object, predicts a property of the detected object.

11. The computer implemented method of claim 10, wherein the property of the detected object comprises at least one of a location of the detected object, a size of the detected object, an orientation of the detected object, a velocity of the detected object, a shape of the detected objects, or a class of the detected object.

12. The computer implemented method of claim 1, further comprising using a neural network that is trained based on labeled data comprising reference object information and data based on which reference signal representation data is obtainable.

13. A computer system comprising a plurality of computer hardware components configured to carry out the method of claim 1.

14. A non-transitory computer readable medium comprising instructions that, when executed by at least one processor, cause the at least one processor to perform the computer implemented method of claim 1.

\* \* \* \* \*

UNITED STATES PATENT AND TRADEMARK OFFICE
CERTIFICATE OF CORRECTION

PATENT NO. : 12,372,636 B2  
APPLICATION NO. : 16/911605  
DATED : July 29, 2025  
INVENTOR(S) : Weimeng Zhu et al.

Page 1 of 1

It is certified that error appears in the above-identified patent and that said Letters Patent is hereby corrected as shown below:

On the Title Page

Column 1, item (72) Inventors; Line 2; Delete "DE (US);" and insert --(DE);-- therefor Signed and Sealed this
Twenty-third Day of December, 2025

John A. Squires
*Director of the United States Patent and Trademark Office*